W. STRAIT.

Assignor to C. E. VAN DUSEN & C. L. STRAIT.

Side-Hill Plow.

No. 9,116. Reissued Mar. 9, 1880.

Witnesses
Fred. G. Dieterich
Daniel Breed

Inventor
Wm. Strait

N. PETERS, PHOTO-LITHOGRAPHER, WASHINGTON, D. C.

UNITED STATES PATENT OFFICE.

WILLIAM STRAIT, OF ONEONTA, NEW YORK, ASSIGNOR TO CHARLES E. VAN DUSEN AND CELESTIA L. STRAIT.

SIDE-HILL PLOW.

SPECIFICATION forming part of Reissued Letters Patent No. 9,116, dated March 9, 1880.

Original No. 184,440, dated November 14, 1876. Application for reissue filed February 16, 1880.

*To all whom it may concern:*

Be it known that I, WILLIAM STRAIT, of Oneonta, in the county of Otsego and State of New York, have invented certain new and useful Improvements in Side-Hill Plows; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

This invention relates to improvements in side-hill plows, whereby the operator is enabled to walk directly in the furrow and in either direction the furrow may be turned; and the invention consists in combining with the standard of a side-hill plow having a stationary beam adjustable handles which can be turned to the right or left, as desired.

It consists, first, in novel devices for pivoting the handles to the standard.

It further consists in an automatically-adjustable colter operated through the medium of the adjustable handles, whereby it is made to correspond with the position of the mold-board when changed from one side to the other of the beam.

It finally consists in other details of construction, as hereinafter fully described, and pointed out in the claims.

Figure 1:
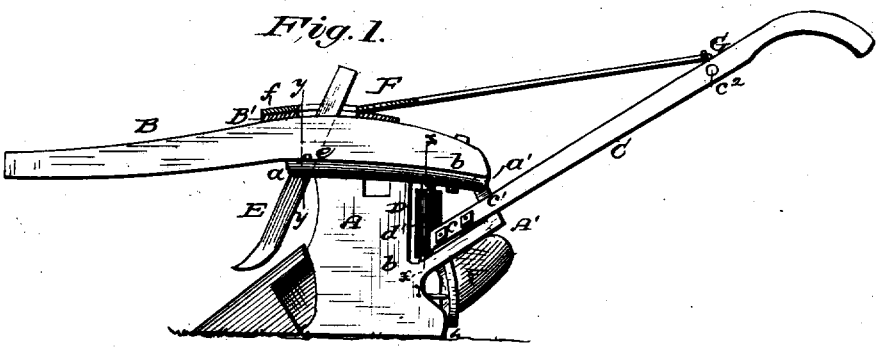
Figure 2:
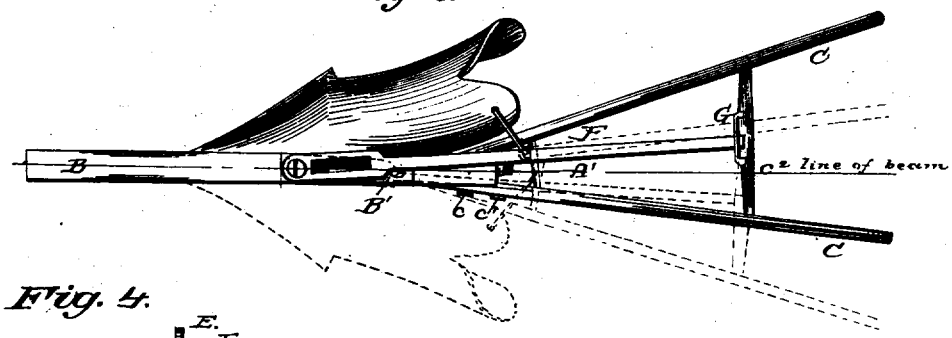
Figure 4:
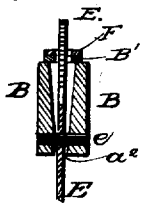
Figure 3:
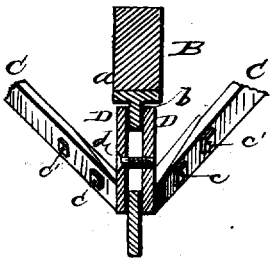

In the drawings, Figure 1 is a side view of my improved plow. Fig. 2 is a top view. Fig. 3 is a vertical section through line *x x*, Fig. 1. Fig. 4 is a vertical section through the line *y y*, Fig. 1.

In the drawings, the standard is represented at A, and the rear extension thereof at A′. The beam-plate *a* forms a long firm bearing-surface for the beam B, which is rigidly secured by nut-bolts in the usual manner.

The rear extension, A′, of the standard has an opening, within which the handles C are pivoted to lugs or pins *b b*, cast on the upper side of the extension and under side of the beam-plate, as shown in Figs. 1 and 3.

The handles C are pivoted to the standard in the following novel manner: Each handle has secured to its lower end an angular metallic piece, D, constructed as shown in Fig. 3, the vertical semicircular portion *d* thereof being adapted to fit loosely around the lugs *b b*, formed upon the standard within the opening thereof, and which are secured together around said lugs by a screw-bolt, *d′*, or other suitable means, allowing them to turn freely upon the lugs or pins *b b*, and which, in connection with the bolts and nuts *c c′*, serve to fasten the lower portions of the handles together. By pivoting the handles to the standard within the opening thereof the rear portion, *a′*, of the extension A′ forms a stop to limit the movement of the handles to the right or left.

The colter E is fitted loosely upon the bolt *e* within the vertical slot in the beam B, so as to hold it in its proper position vertically; and said slot being made wider at the top than at the bottom in a direction transverse to the beam, as shown in Fig. 4, allows the colter or cutter a lateral vibrating movement, its center of motion being the pivot situated at the bottom of the slot in the beam. The colter or cutter passes up through the slotted bearing-plate B′ and slotted shifting-lever F, by which it is operated. This lever F is pivoted to the beam at *f*, and its free end extends backward and passes through a loop or guide, G, rigidly secured centrally to the upper cross-bar, $c^2$, of the handles, as shown in Fig. 2. This loop or guide, while it prevents an upward or downward movement of the lever, permits a free movement from side to side as the handles are turned from right to left, or vice versa.

The operation of my plow may be described as follows: When the mold-board is placed at the right-hand side of the beam B the handles will also be turned to the right, in the position shown by plain lines in Fig. 2, thus enabling the operator to walk directly in the furrow.

By the above-described movement of the handles the free end of the shifting-lever is caused to move from the right to the left of the loop, as clearly shown by the plain lines in Fig. 2, which moves the colter or cutter laterally, so as to bring its cutting-edge nearly beneath the left-hand side of the beam, or coincident with the line of cut of the upright share of the plow.

When the mold-board is changed to the left-hand side of the beam the handles are also turned to the left, as shown in dotted lines in Fig. 2, so as to allow the operator to walk directly in the furrow, and at the same time the lever is caused to move from the left to the right of the loop, as shown in dotted lines in Fig. 2, which moves the cutter laterally, so as to bring the cutting-edge nearly beneath the right-hand side of the beam, to correspond with the line of cut as reversed.

The mold-board and handles are secured in their relative positions by a hook fastened centrally upon the cross-rod of the handles, with corresponding holes in the mold-board. The front edge of the beam-plate has a slot, $a^2$, forming a holder for the cutter or colter to rest against, as shown in Fig. 4.

I do not desire to limit myself to the precise intermediate mechanism herein described for operating the colter or cutter through the medium of the adjustable handles, as any other suitable equivalent mechanism could be used without departing from the spirit of my invention.

I do not wish to confine myself to the handles upon a standard having a wooden beam, as the adjustable or pivoted handles can be used equally well on an iron-beam plow.

I am aware that laterally-adjustable colters have been automatically shifted from side to side by turning the mold-board; but I am not aware that they have ever been so shifted directly from the pivoted handles.

I claim as my invention—

1. In a plow having a stationary beam, the combination of a reversible mold-board with handles made laterally adjustable and capable of having the central point between the handles moved either to the right or the left past the line of the beam, in order to enable the operator to walk in the furrow when turned either to the right or the left, substantially as set forth.

2. In a plow having a stationary beam, a reversible mold-board and laterally-adjustable handles, in combination with a colter or cutter made adjustable either to the right or the left, substantially as specified.

3. The devices for pivoting the handles to the standard, consisting of the lugs or pins *b b* and metallic angular pieces D, having semicircular portions *d*, secured around the lugs or pins in the manner substantially as described.

4. The combination of the pivoted handles with the standard A, having the opening in which the handles are pivoted, and the connecting-bar $a'$, arranged to form a stop to limit the movement of the handles, as described.

5. In a reversible plow, the combination, with a laterally-adjustable colter or cutter and laterally swinging or adjustable handles, of the lever F, or its equivalent, substantially as described, whereby said colter or cutter is adjusted laterally by the movement of the handles, substantially as and for the purposes specified.

6. The combination of the colter or cutter E, shifting-lever F, loop or guide G, and adjustable handles C, substantially as and for the purpose specified.

In testimony that I claim the foregoing I have hereunto set my hand this 13th day of February, 1880.

WM. STRAIT.

Witnesses:
DANIEL BREED,
FRED. G. DIETERICH.